US010262683B2

(12) United States Patent
Staffaroni et al.

(10) Patent No.: US 10,262,683 B2
(45) Date of Patent: Apr. 16, 2019

(54) SELF-ALIGNED HYBRID AU—RH NEAR FIELD TRANSDUCER FOR ENHANCED RELIABILITY

(71) Applicant: Headway Technologies, Inc., Milpitas, CA (US)

(72) Inventors: Matteo Staffaroni, San Ramon, CA (US); Xuhui Jin, San Jose, CA (US); Weihao Xu, San Jose, CA (US); Cherng-Chyi Han, San Jose, CA (US); Weisheng Hu, Fremont, CA (US); Shengyuan Wang, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/011,892

(22) Filed: Feb. 1, 2016

(65) Prior Publication Data

US 2017/0221505 A1    Aug. 3, 2017

(51) Int. Cl.
*G11B 5/00* (2006.01)
*G11B 5/31* (2006.01)
*G11B 5/60* (2006.01)

(52) U.S. Cl.
CPC ............ *G11B 5/314* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| 8,488,419 | B1 | 7/2013 | Jin et al. |
| 8,804,468 | B2 | 8/2014 | Zhao et al. |
| 9,019,803 | B1 | 4/2015 | Jin et al. |
| 9,064,515 | B2 | 6/2015 | Zhao et al. |
| 9,099,112 | B1 | 8/2015 | Balamane et al. |
| 9,129,620 | B2 | 9/2015 | Cheng et al. |
| 2013/0330573 | A1* | 12/2013 | Zhao .................... G11B 5/3133 428/814 |

OTHER PUBLICATIONS

Co-pending U.S. Appl. No. 14/918,627, filed Oct. 21, 2015, "Thermal Assisted Magnetic Recording Light Delivery Waveguide Circuit for Reduced Stray Light Induced Writer Protrusion," by Matteo Staffaroni et al., 43 pgs.

* cited by examiner

*Primary Examiner* — Brian M Butcher
(74) *Attorney, Agent, or Firm* — Saile Ackerman LLC; Stephen B. Ackerman

(57) ABSTRACT

A near field transducer (NFT) is formed between a waveguide and main pole layer at an air bearing surface (ABS). The NFT includes a resonator body layer made of Au, for example, with a front side at a first plane that is recessed a first distance from the ABS and a back side that is at a second plane formed parallel to the ABS and first plane. The NFT also has a peg layer with a rectangular peg portion between the ABS and first plane, and a larger back portion between the first and second planes that overlays directly above the resonator body layer. The peg layer is preferably made of Rh to improve mechanical stability of the NFT without significantly degrading overall optical efficiency of the NFT. A blocker may be formed between the ABS and waveguide to prevent light not coupled to the NFT from reaching the ABS.

29 Claims, 11 Drawing Sheets

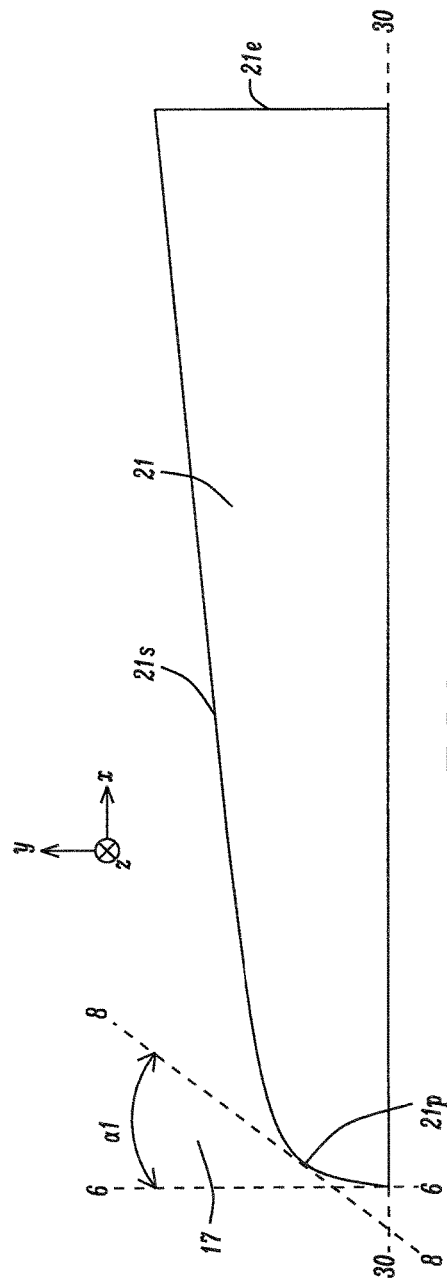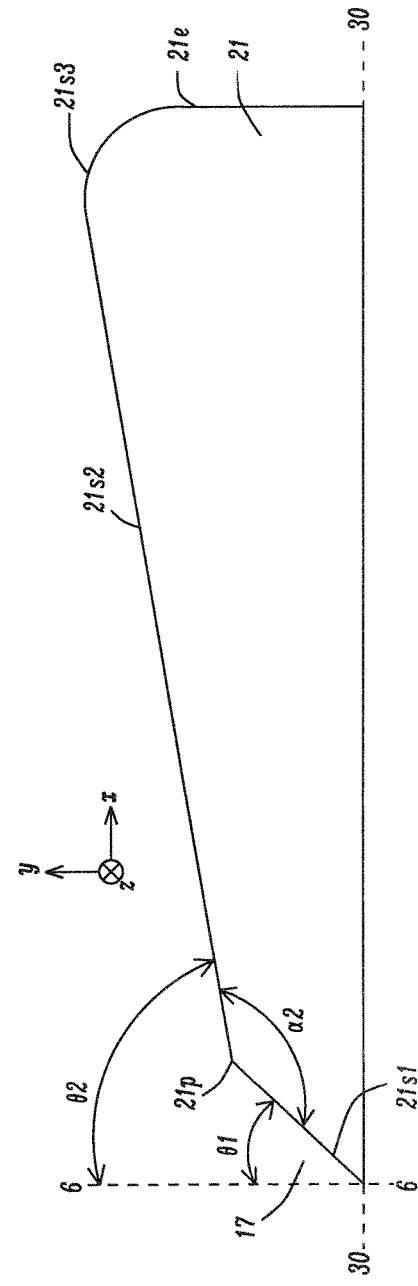

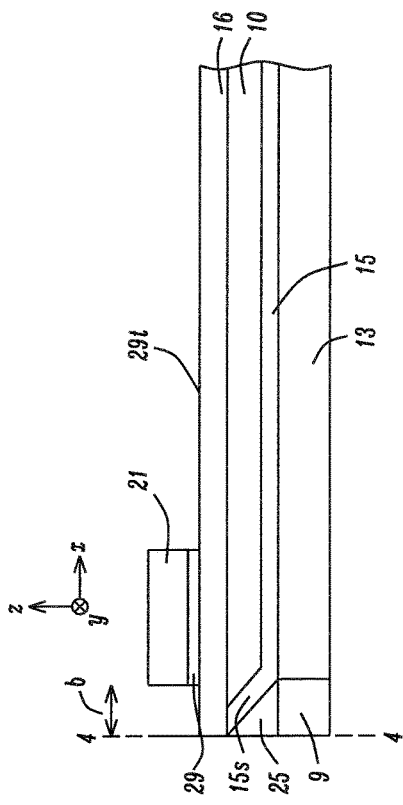
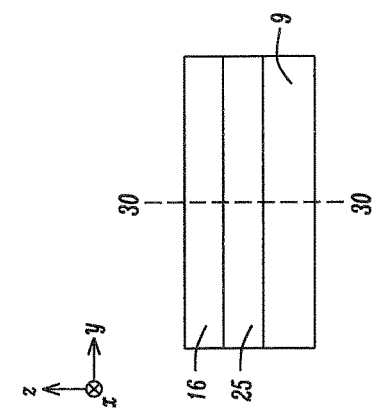
FIG. 10a
FIG. 10b
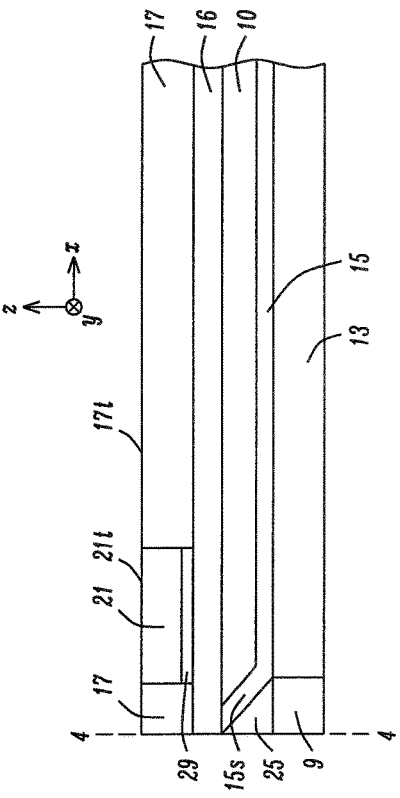
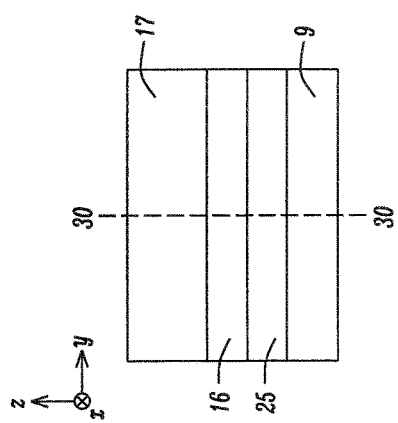
FIG. 11a
FIG. 11b

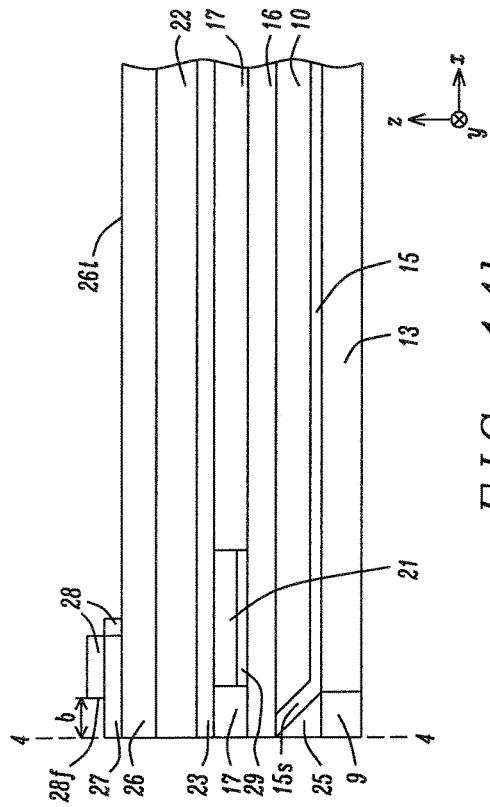
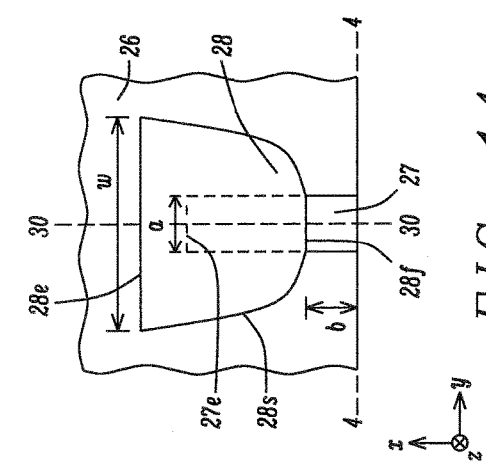
FIG. 14a
FIG. 14b
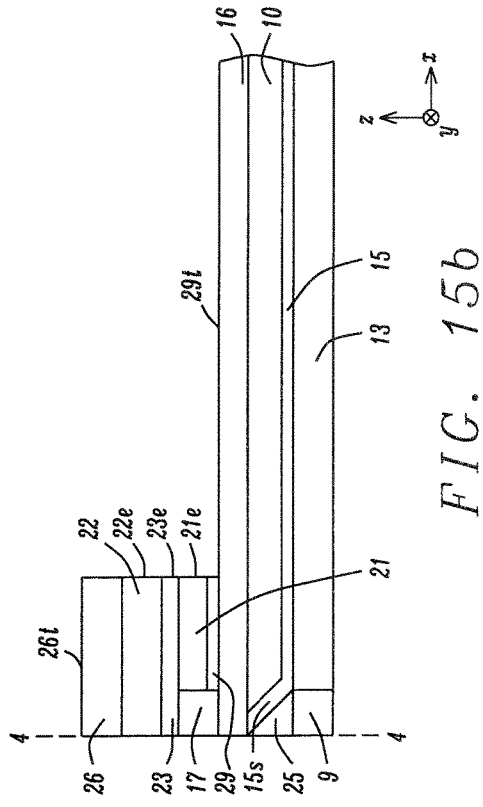
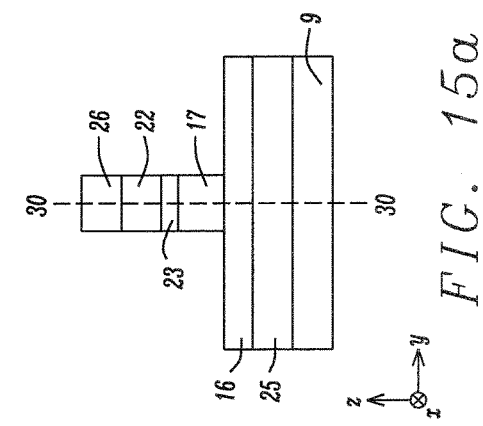
FIG. 15a
FIG. 15b

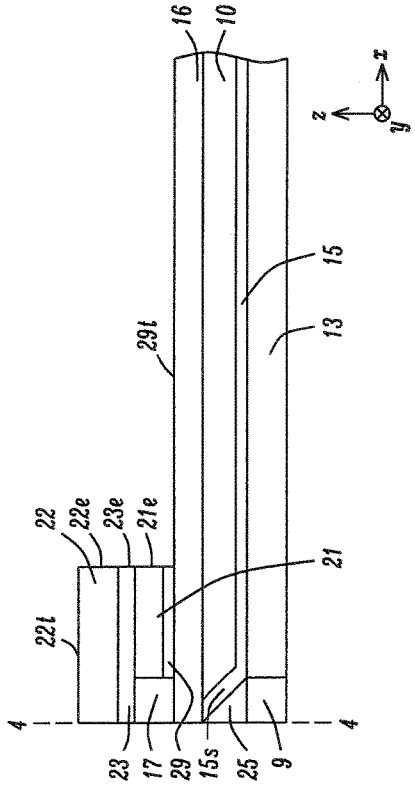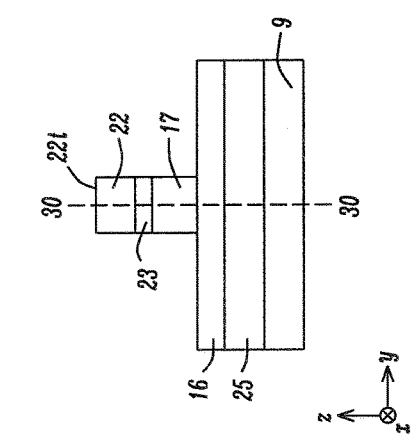
FIG. 16a
FIG. 16b
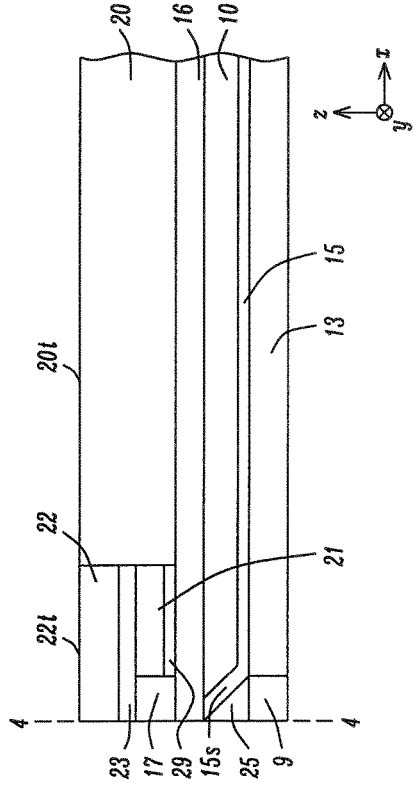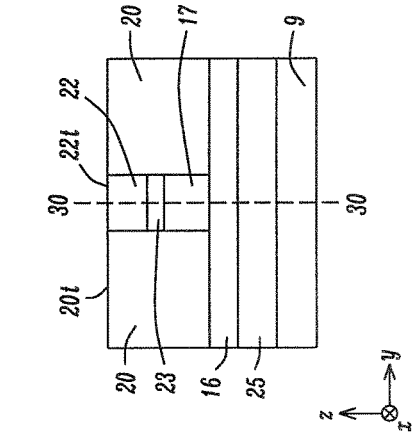
FIG. 17a
FIG. 17b

SELF-ALIGNED HYBRID AU—RH NEAR FIELD TRANSDUCER FOR ENHANCED RELIABILITY

RELATED PATENT APPLICATIONS

This application is related to the following: U.S. Pat. Nos. 8,488,419; 9,019,803; Ser. No. 14/918,627, filing date Oct. 21, 2015; all assigned to a common assignee and herein incorporated by reference in their entirety.

TECHNICAL FIELD

The present disclosure relates to a thermally assisted magnetic recording (TAMR) device, and in particular to a near field transducer (NFT) structure wherein a peg portion has improved thermo-mechanical stability, and the resonator portion may have wetting angle compliant geometry to provide better NFT reliability.

BACKGROUND

TAMR involves raising the temperature of a small region of the magnetic medium to near its Curie temperature where its coercivity and anisotropy are significantly reduced and magnetic writing becomes easier to achieve even with weak write fields characteristic of small write heads in high recording density schemes. In TAMR, optical power from a light source is converted into localized heating in a recording medium during a write process to temporarily reduce the field needed to switch the magnetizations of the medium grains. Thus, data storage density in a hard disk drive (HDD) in terms of kTPI (thousands of tracks per inch) can be further improved.

Optical power is delivered to the NFT by means of a dielectric waveguide where light from the waveguide is coupled into a NFT resonant mode, and specifically to a substantial portion of the NFT called the resonator body. Then, the NFT resonant mode is coupled to a small portion of the magnetic medium to generate a heating spot through a NFT peg feature, hereinafter referred to as the peg that has one end abutting the air bearing surface (ABS). The peg down-track and cross-track dimensions at the ABS largely dictate optical power intensity on the magnetic recording layer. Waveguide light typically originates from a diode mounted on the back side of a slider and has a wavelength of about 800 nm. The light may be in a transverse electric (TE) or transverse magnetic (TM) mode.

A critical requirement for proper TAMR operation is that the integrity of the peg must not be compromised since even a subtle peg shape change can cause a drastic drop in TAMR performance. Current state of the art TAMR NFTs usually comprise a so-called plasmonic material such as Au or an alloy thereof which has optical properties conducive to efficient excitation of the NFT resonance by waveguide light. Unfortunately, the most optically favorable materials for use in NFTs also have poor thermo-mechanical properties. This relationship presents a problem because the NFT is required to operate at elevated temperatures in an environment subjected to considerable mechanical stress. Furthermore, the peg is at the ABS and there is a possibility of a head disk interaction (HDI) event where the write head accidentally contacts a high point on the disk surface. Therefore, a new NFT structure is needed to provide peg shape integrity while maintaining acceptable optical transmission efficiency.

SUMMARY

One objective of the present disclosure is to provide materials and a shape for NFT resonator body and peg portions that enable efficient excitation of NFT resonance by waveguide light and improved thermo-mechanical properties in a TAMR device.

A second objective of the present disclosure is to provide a method of forming the NFT structure according to the first objective that can be fabricated with excellent process control.

These objectives are realized in various embodiments of the present disclosure wherein a TAMR write head structure includes a write pole and a waveguide with a near field transducer (NFT) formed therebetween at the ABS. The NFT is comprised of a peg layer with a top surface facing the write pole, and a resonator body layer adjoining a bottom surface of the peg layer in a first embodiment. A front section of the peg layer called the peg has a rectangular shape from a top-down view, has a width of 20-60 nm in a cross-track direction, and extends a step length distance of 10-50 nm in a direction that is orthogonal to the ABS. The peg front end is at the ABS while a back end adjoins a front end of a back section of the peg layer. The back section preferably has two sides separated by increasing distance in a cross-track direction with increasing distance from the ABS, and terminating at a back side that is parallel to the ABS. The back section of peg layer may have a parabolic or triangular design with a shape that is essentially duplicated in the underlying resonator body layer. In some embodiments, the resonator body is made of Au and has a wetting angle compliant (WAC) shape wherein the sidewall shape proximate to the ABS has an angle of about 140° to minimize surface energy of the resonator body along an oxide interface.

The peg layer is made of a thermally and mechanically robust material such as Rh, Ru, Pd, Pt, TiN, or ZrN with a down-track thickness of about 30-60 nm while the resonator body layer is 25-60 nm thick and is made of Au, Ag, Cu, or alloys thereof having plasmonic character with excellent optical properties. The resonator body has a front end along the same plane as the peg back end, and has a bottom surface facing the waveguide. The resonator body front end is separated from the ABS by a first dielectric layer.

In some embodiments, the NFT includes a third layer called an adhesion layer formed between the peg layer and resonator body layer, and having a top-down shape essentially equivalent to that of the peg layer. The adhesion layer may also be formed between the resonator body front end and the first dielectric layer, and is comprised of Ta, Zr, Y, Ir, or another element or alloy that binds well to both adjoining metal NFT layers.

The front end of the waveguide is preferably separated from the ABS by a second dielectric layer, and a blocker that suppresses waveguide modes along the waveguide bottom surface. The blocker prevents uncoupled waveguide light from reaching the magnetic medium and thereby avoids degraded thermal confinement of the heating spot on the media. The blocker preferably has a down-track thickness greater than that of the waveguide such that a bottom blocker surface is below the waveguide bottom surface. In some cases, the blocker is a metal or alloy made of thermally and mechanically robust material such as Cr, Ru, NiFe, FeCo, Rh, TiN, or the like. In other embodiments, the blocker may be a laminated structure comprised of one or more of $Ta_2O_5$, alumina, or other dielectric materials.

According to another embodiment, the write pole may be imbedded in side heat sinks made of a high thermal conductivity material that adjoins both sides of the write pole proximate to the ABS. Moreover, there may be a heat sink adjoining a leading side of the write pole and contacting the peg layer top surface.

The present disclosure is also a method of fabricating a self-aligned NFT in a TAMR head. The manufacturing sequence comprises forming a blocker on a leading shield and a first dielectric layer behind the leading shield. Then, a bottom cladding layer is deposited on the first dielectric layer and on a sloped side of the blocker that faces away from the ABS. After the waveguide is formed on the bottom cladding layer, a top cladding layer and a first adhesion layer are formed atop the waveguide core. A NFT resonator body layer is deposited on the first adhesion layer. Thereafter, a first photoresist layer is coated and patterned on the resonator body layer to define the step length or recessed distance of the resonator body front end from the ABS. Ion beam etching (IBE) is performed to remove a front portion of the resonator body layer proximate to the eventual ABS and a back portion thereof above the waveguide. After the photoresist is stripped, a silica dielectric layer is deposited by a plasma enhanced chemical vapor deposition followed by a chemical mechanical polish (CMP) step to yield the desired thickness of the resonator body and the first gap layer.

Next, an optional thin second adhesion layer, the peg layer, and a hard mask comprised of a lower carbon layer and an upper Ta layer are sequentially deposited on the substrate comprised of the silica and resonator body layers. A second photoresist layer is coated on the hard mask and patterned into a strip that will later define the shape of the peg. A reactive ion etch (RIE) is performed to remove the Ta hard mask that is not covered by the second photoresist strip pattern. After the second photoresist is removed, a second Ta hard mask layer is patterned by a lift off process involving a third photoresist layer having the desired parabola (or triangular or wetting angle compliant) shape of the back section of peg layer. The lift off process also determines the step length of the peg orthogonal to the ABS. The shape in the third photoresist pattern is transferred through the second Ta hard mask and then the third photoresist is stripped.

Another RIE process is performed to remove portions of the lower carbon layer that are not protected by the Ta hard mask layers thereby forming a carbon mask. Thereafter, a second IBE process is employed to remove portions of the resonator body layer and peg layer that are not covered by the carbon mask. The second IBE step also removes the remaining Ta hard mask layers and is referred to as a self-aligned process. The carbon mask is then removed by a third RIE process. Finally, an adhesion layer and an oxide layer such as silica is deposited by a PECVD step and is followed by a chemical mechanical polish (CMP) process to form a top surface on the peg layer that is coplanar with the silicon oxide layer.

BRIEF DESCRIPTION OF THE DRAWINGS

FIG. 5b is a top-down view showing the shape of the adhesion layer in the hybrid NFT structure in FIG. 5a.

FIG. 7a is top-down view of one half of a NFT resonator body formed with a parabolic shape according to an embodiment described herein.

FIG. 7b is top-down view of a NFT resonator body formed with a wetting angle compliant shape according to another embodiment of the present disclosure.

FIGS. 8a, 10a, 11a-13a, and 15a-17a are ABS views depicting a series of steps used to fabricate a hybrid NFT structure according to an embodiment of the present disclosure.

FIGS. 9a and 14a are top-down views of the partially formed NFT structures shown in FIG. 9b and FIG. 14b, respectively.

FIGS. 8b, 10b, 11b-13b, and 15b-17b are cross-sectional views illustrating the series of steps shown in FIGS. 8a, 10a, 11a-13a, and 15a-17a, respectively.

DETAILED DESCRIPTION

The present disclosure is a self-aligned hybrid near field transducer (NFT) with a resonator body layer and peg layer made of different materials to provide efficient excitation of NFT resonance by waveguide light, and improved reliability by way of enhanced thermo-mechanical properties compared with conventional NFTs. In all drawings, the y-axis is the cross-track direction, the z-axis is the down-track direction, and the x-axis is a direction orthogonal to the air bearing surface (ABS) and towards a back end of the device. Top surface indicates a side of a layer that faces the main pole while a front end or front side relates to a surface of a layer at or facing the ABS. The term "sidewall" indicates a side of a layer that is aligned substantially in a down-track direction. The self-aligned hybrid NFT is incorporated in a TAMR write head that may be part of a merged read head/write head design as appreciated by those skilled in the art. TAMR is also known in the art as heat assisted magnetic recording (HAMR).

Figure 1A:
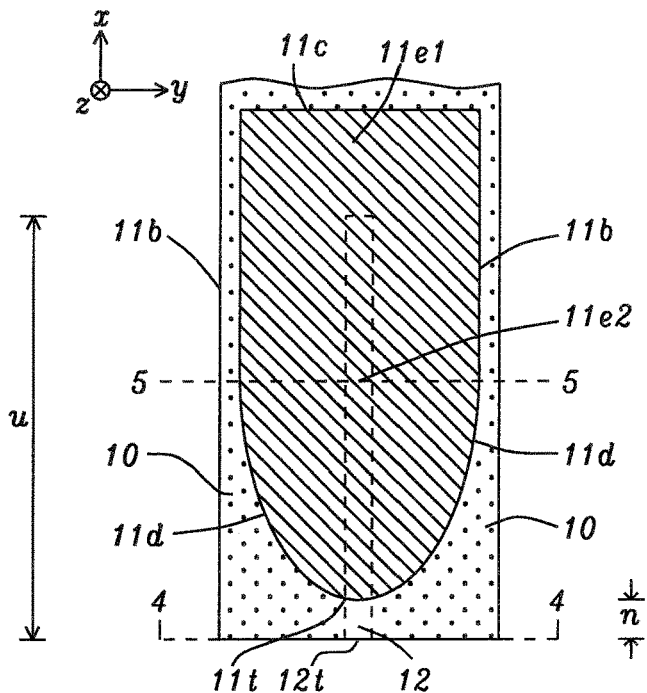
FIGS. 1a-1b are top-down and cross-sectional views, respectively, of a NFT and waveguide structure previously fabricated by the inventors.
Figure 1B:
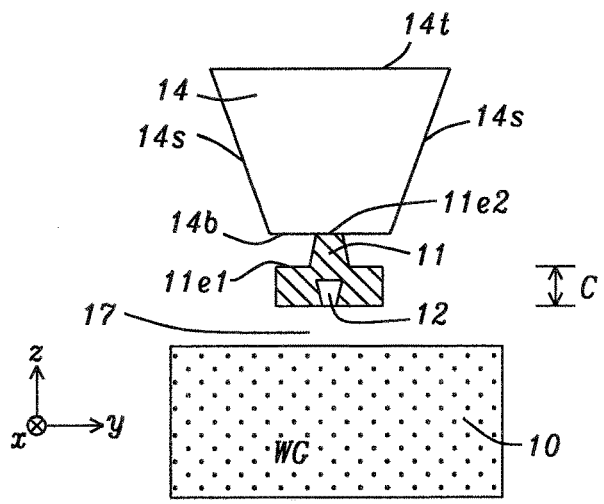

Referring to FIG. 1a, a top-down view is provided of a NFT that was previously disclosed by the inventors in related U.S. Pat. No. 8,488,419 where reliability of the NFT is improved by forming a rod-like shaped peg layer 12 that extends a distance u from a front end 12t at the ABS 4-4 to a back end that is below metal layer 11. The peg layer is comprised of Ru, Cr, Pd, Pt, Ti, W, Ta, Fe, Co, Ni, or alloys thereof to provide low atom mobility, good thermal robustness and mechanical hardness, and superior resistance to corrosion. Metal layer 11 is made of Au, Cu, Ag, or alloys thereof for excellent optical efficiency, has a front end 11t recessed a distance n from the ABS, and has a parabolic shape bounded by sides 11b, 11d and back side 11c. As shown in FIG. 1b which is a cross-sectional view along plane 5-5 in FIG. 1a, the hybrid NFT has a planar bottom surface comprised of both layers 11, 12 that faces the waveguide 10, and separated therefrom by a gap layer 17 that is made of a dielectric material. A top surface of the hybrid NFT has non-planar sections 11e1, 11e2, and contacts main pole 14 at leading side 14b.

Subsequently, we disclosed in related U.S. Pat. No. 9,019, 803 that a NFT (not shown) may be further modified for improved performance and reliability by forming a laminated structure comprised of a plurality of "X" layers and a plurality of "Y" layers that are laid down in an alternating fashion, and each having a top surface that is non-planar along a cross-track direction. The "X" layers are selected from one or more of Au, Ag, Cu, Al, and alloys thereof with other metals such as Co or Ni to provide high efficiency for light propagation and plasmon mode excitation. "Y" layers are selected from one or more of Ru, Cr, Pd, Pt, Ti, W, Ta, Mg, Fe, Co, Ni, Cu, Zr, and yttrium (Y), or alloys thereof for low atom mobility, or may be made of a dielectric material such as $Ta_2O_5$, $Al_2O_3$, $SiO_2$, SiON, $Si_3N_4$, $Ti_2O_5$, and $HfO_2$. In one embodiment, the NFT has planar top and bottom surfaces such that the larger back portion is an extension of the layers in the front (peg) portion.

Herein we disclose additional improvements in our TAMR write head and NFT design that enable increased reliability without significantly affecting plasmon mode efficiency. In particular, the peg is comprised of a metal with improved thermo-mechanical robustness, and the size of a back portion of peg layer is substantially increased to allow better thermal conductance away from the peg and the ABS. Also, the NFT resonator body layer is made of Au, Ag, Cu, or alloys thereof and may be constructed to have a wetting angle compliant shape such that the resonator body layer and peg layer do not deform at elevated temperatures during write operations. In preferred embodiments, a blocker is inserted between a front end of the waveguide and the ABS to prevent uncoupled or lightly coupled waveguide modes from propagating to the ABS and thereby prevent unwanted heating of the magnetic medium.

Figure 2A:
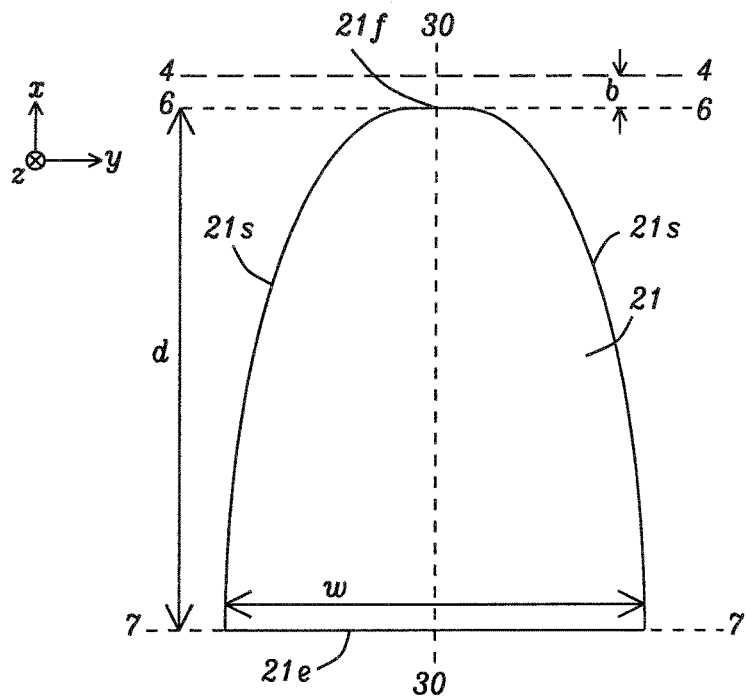
FIG. 2a and FIG. 2b show top-down views of a NFT resonator body layer and a NFT peg layer, respectively, in a hybrid NFT formed according to a first embodiment of the present disclosure.
Figure 2B:
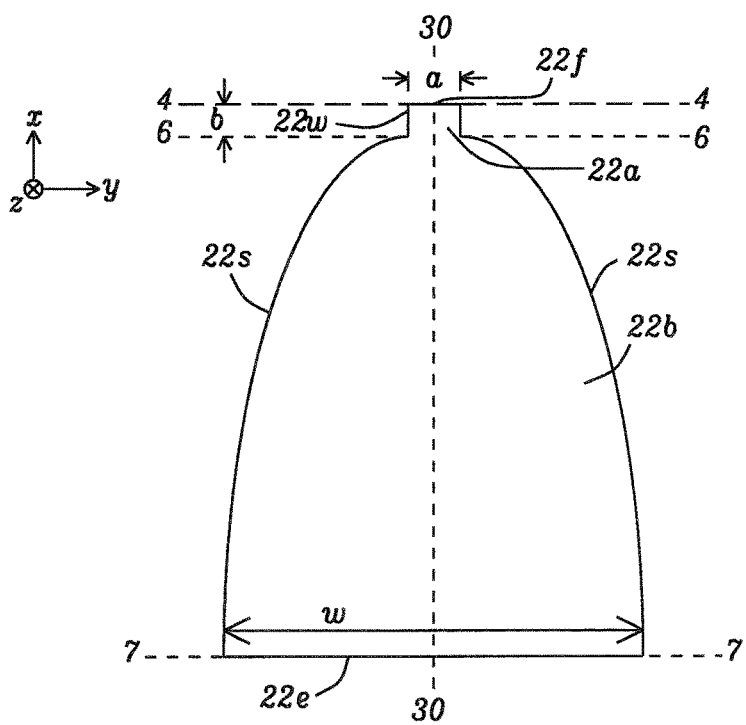

Referring to FIG. 2a and FIG. 2b, top-down views of a NFT resonator body layer 21 and NFT peg layer 22, respectively, are shown according to a first embodiment of the present disclosure. Note that center plane 30-30 is aligned orthogonal to ABS 4-4 and bisects NFT layers 21, 22 such that sides 21s, 22s, respectively, are equidistant from the center plane. There is greater cross-track separation between sides 21s with increasing distance from the ABS. Moreover, sides 22s are aligned above sides 21s such that back ends 21e, 22e have the same cross-sectional width w, and a lengthwise dimension d of the resonator body layer between a front side at plane 6-6 and a back side at plane 7-7 is essentially equivalent to a lengthwise dimension of the back portion 22b of the peg layer. Thus, in the assembled NFT structure, the peg layer is directly above a top surface of the resonator body layer. In FIG. 2a, the peg layer and other overlying layers are removed in order to clearly show the top-down shape of layer 21. In other embodiments (not shown), sides 21s and 22s may form a substantially triangular shape with ends 21e, 22e, respectively.

In FIG. 2b, peg 22a is the front section of the peg layer and is shown with a front side 22f at the ABS 4-4, sides 22w aligned orthogonal to the ABS, and a back side at plane 6-6 that is parallel to the ABS. The peg length b in the x-axis direction is from 10-50 nm, and preferably 30-40 nm, and also is the recessed distance (step length) of resonator body layer front side 21f from the ABS. The peg cross-track width a is dependent on the track density and is preferably 40-60 nm for kTPI targets from 400 kTPI up to 600 kTPI. As HDD track density increases to 800 kTPI, for example, peg cross-track width is scaled down to less than 30 nm. In some embodiments, the peg cross-track width may have a minimum value of about 20 nm. The peg layer is preferably comprised of Rh, Ru, Pd, Pt, TiN, or ZrN.

Figure 3:
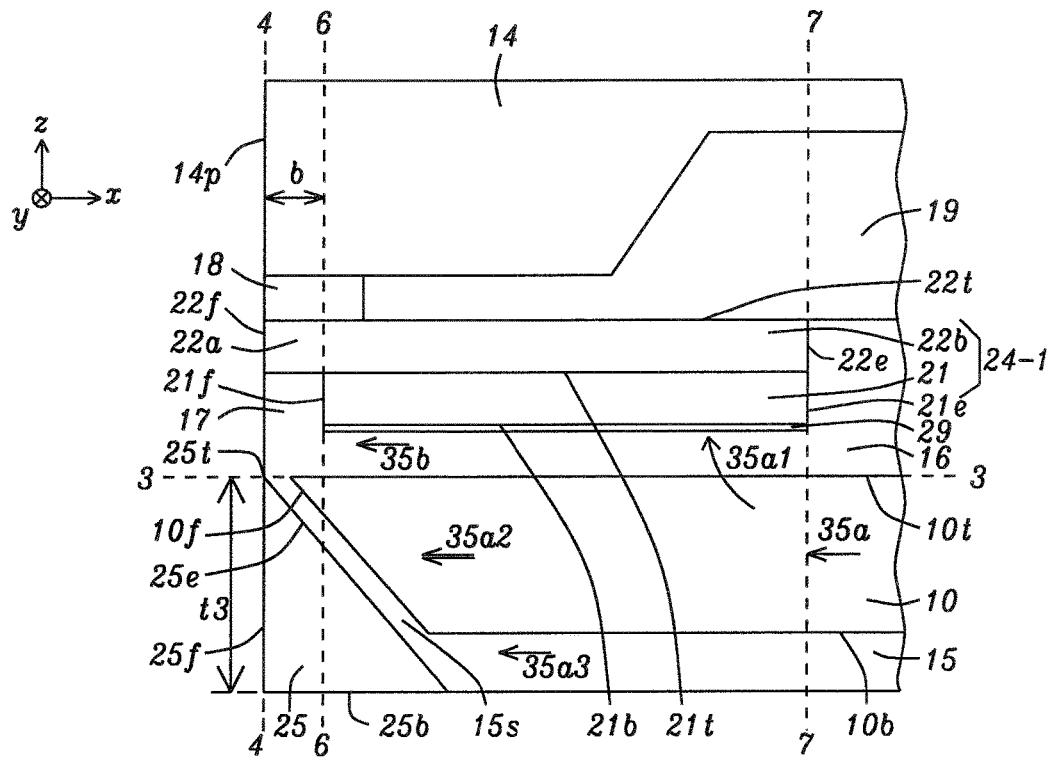
FIG. 3 is a cross-sectional view according to one embodiment of the present disclosure where the hybrid NFT in FIGS. 2a-2b is incorporated in a TAMR write head.

Referring to FIG. 3, one embodiment of a self-aligned hybrid NFT according to the present disclosure is shown between waveguide 10 and main pole 14 of a TAMR head in a cross-sectional view. It should be understood that the main pole and waveguide may have shapes different from those depicted although the main pole always has a front side 14p at the ABS 4-4. However, a key feature is that the NFT 24-1 has a resonator body layer 21 with a planar top surface 21t adjoining a bottom surface of peg layer 22b, and a planar bottom surface 21b facing a top surface 10t of the waveguide. Note that the term waveguide may be used interchangeably with "waveguide core" when describing embodiments of the present disclosure. Furthermore, a top surface 22t of the peg 22a and back portion 22b of the peg layer is planar and faces a bottom surface of the main pole. There is a first gap layer 17 comprised of a dielectric material with a low refractive index at the ABS and extending to adjoin a front side 21f of the resonator body layer. A second gap layer 18 is formed between the peg layer and main pole and extends from the ABS to beyond plane 6-6 in some cases. Each of the gap layers may be made of alumina, silicon oxide, silicon oxynitride (SiON), or $MgF_2$, for example, to optimize the transmission of the surface plasmon (resonant) mode on the NFT, and especially along sidewalls (not shown) of the resonator body layer and along peg 22a surfaces. Resonator body layer thickness t1 is from 30 to 50 nm, and peg layer thickness t2 is about 35 to 55 nm.

Waveguide core 10 is formed on a bottom cladding layer 15 and a portion 15s thereof extends upward between the blocker back side 25e and waveguide front side 10f until reaching plane 3-3 that is coplanar with waveguide top surface 10t. A top cladding layer 16 is formed above plane 3-3 and a top surface 10t of the waveguide core. Above the top cladding layer and adjoining the bottom surfaces of the first gap layer 17 and resonator body layer 21 is an optional adhesion layer 29.

Light 35a is generated by a laser diode (not shown) mounted on the back end of the slider on which the TAMR head is formed, and is propagated toward the ABS within waveguide 10. A substantial portion of waveguide light 35a1 is coupled to NFT resonator body 21 in the form of a plasmonic resonance or surface plasmon mode 35b that continues to peg 22a, and then is coupled to a heating spot on a magnetic medium (not shown) proximate to the ABS 4-4 thereby facilitating a write process involving a magnetic bit proximate to the heating spot. The remaining waveguide light 35a2 and a portion 35a3 along the waveguide bottom 10b are not coupled to the NFT and continue to propagate toward the ABS. The front side 10f of the waveguide may be sloped with respect to the ABS such that a front end of top surface 10t is closer to the ABS than a front end of bottom surface 10b. In other embodiments, the waveguide front side may be formed essentially parallel to plane 6-6 as shown in FIG. 4.

Returning to FIG. 3, a blocker 25 is preferably formed between a front side 10f of the waveguide and the ABS to reflect light 35a2 and 35a3 toward a back end of the TAMR head thereby preventing unwanted heating of the magnetic medium outside the magnetic bit to be written to. The blocker preferably has a down-track thickness t3 greater than that of waveguide 10, and a cross-track width greater than that of the waveguide. In some embodiments, the blocker is a metal or alloy such as Rh, TiN, Ru, NiFe, FeCo, or the like. In other embodiments, the blocker may be a laminated structure comprised of one or more of $Ta_2O_5$, alumina, or other dielectric materials. A front side 25f of the blocker may abut the ABS 4-4. In the exemplary embodiment in FIG. 3, the blocker has a top surface 25t, and a triangular shape from a cross-track view with a sloped back side 25e facing the waveguide.

The TAMR head may also include a bottom heat sink 19 contacting a bottom surface of main pole 14 and a top surface 22t of the back portion of peg layer. A front end of the heat sink adjoins a back side of gap layer 18. A bottom heat sink is employed to compensate for main pole heating caused by proximity of the main pole to the hybrid NFT and the elevated peg layer temperatures during write processes. The heat sink is preferably made of a high thermal conductivity material such as Au, Cu, Cr, Ti, Ta, Ru, Pt, Pd, and SiC and typically extends a greater distance from the ABS 4-4 than back sides 21e, 22e of the NFT 24-1. Moreover, there may be side heat sinks (not shown) on the sides of the main pole and in contact with bottom heat sink 19.

Figure 4:
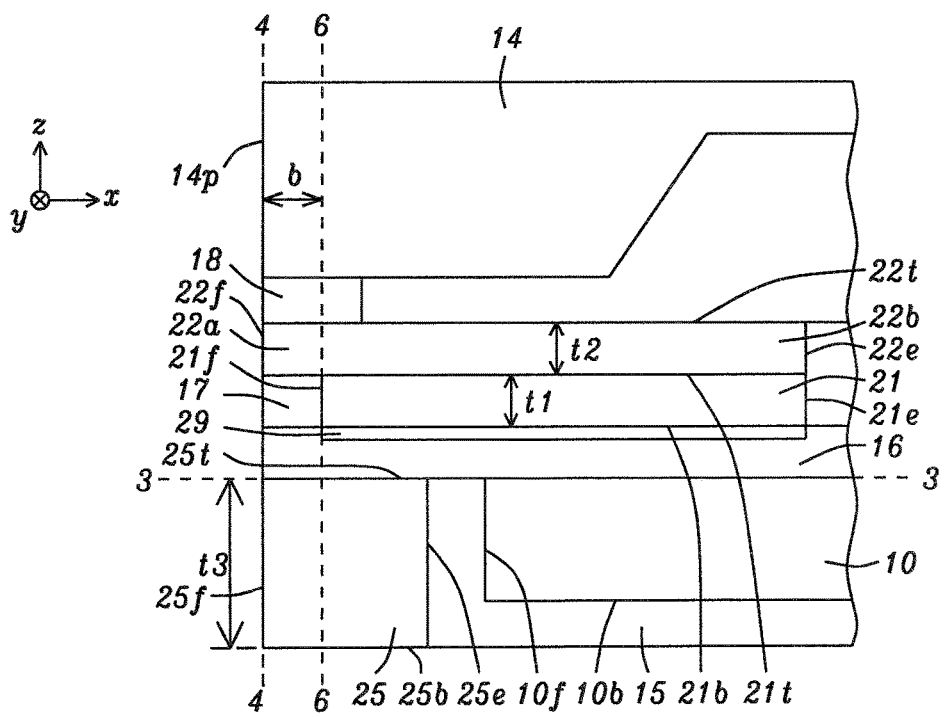
FIG. 4 is a cross-sectional view of another embodiment of the present disclosure wherein the waveguide light blocker in FIG. 3 has an alternative design.

As shown in FIG. 4, the blocker 25 may have a rectangular shape with a top surface 25t at plane 3-3. In some embodiments (not shown), the blocker has a flat top surface 25t combined with a sloped back side 25e previously described with regard to FIG. 3. Preferably, bottom surface 25b of the blocker is below the waveguide bottom surface 10b as in the previous embodiment.

The present disclosure also encompasses other embodiments of a blocker in the path of a waveguide such as those disclosed in related patent application Ser. No. 14/918,627 where a waveguide may include one or more bends that divert a section of the waveguide away from the center plane.

Figure 5A:
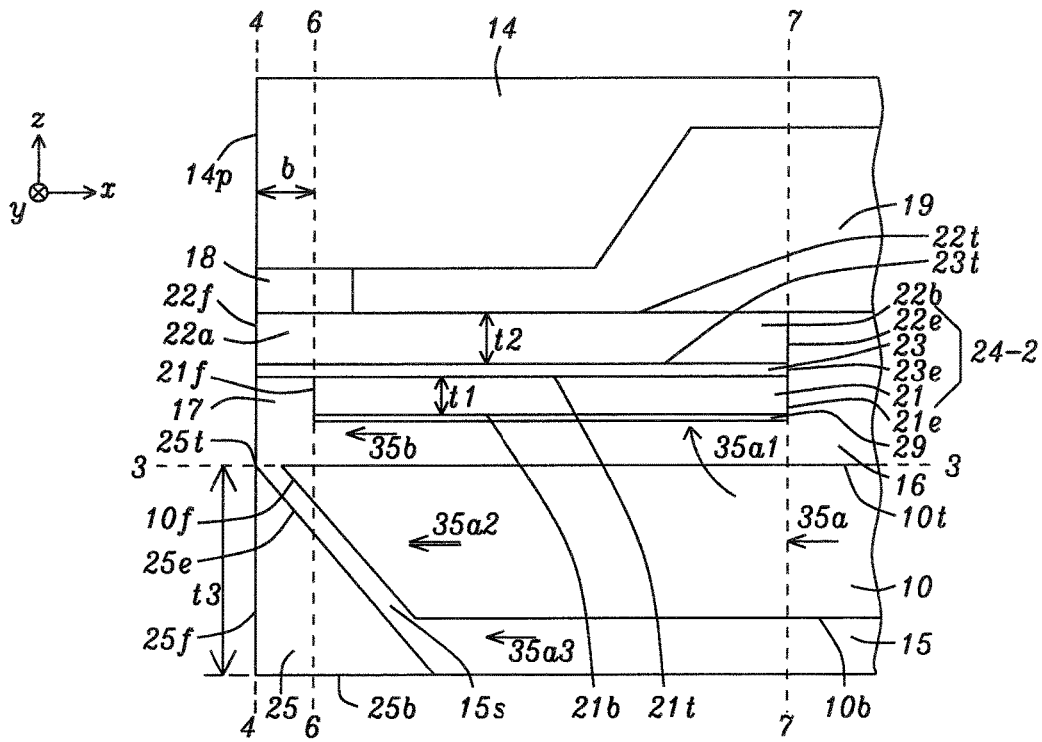
FIG. 5a is a cross-sectional view of a hybrid NFT according to a second embodiment of the present disclosure where the NFT structure in FIG. 3 is modified by inserting an adhesion layer between the resonator body and peg layer.

Referring to FIG. 5a, a second embodiment of the present disclosure is illustrated and is a modification of the NFT structure in FIG. 3 to yield NFT 24-2. In particular, an adhesion layer 23 is inserted between the resonator body 21 and the back portion 22b of the peg layer to give a self-aligned hybrid NFT structure having a stack of three layers. Thus, top surface 23t of the adhesion layer contacts a bottom surface of the peg layer, and a bottom surface of the adhesion layer adjoins the top surface 21t of the resonator body. The adhesion layer is comprised of Ta, Zr, Y, Ir, or another element or alloy that binds well to both of the underlying and overlying layers 21, 22, respectively, thereby improving adhesion in the NFT structure and minimizing any tendency for delamination within the NFT during mechanical stress events, or at elevated temperatures which are achieved during write processes.

Figure 5B:
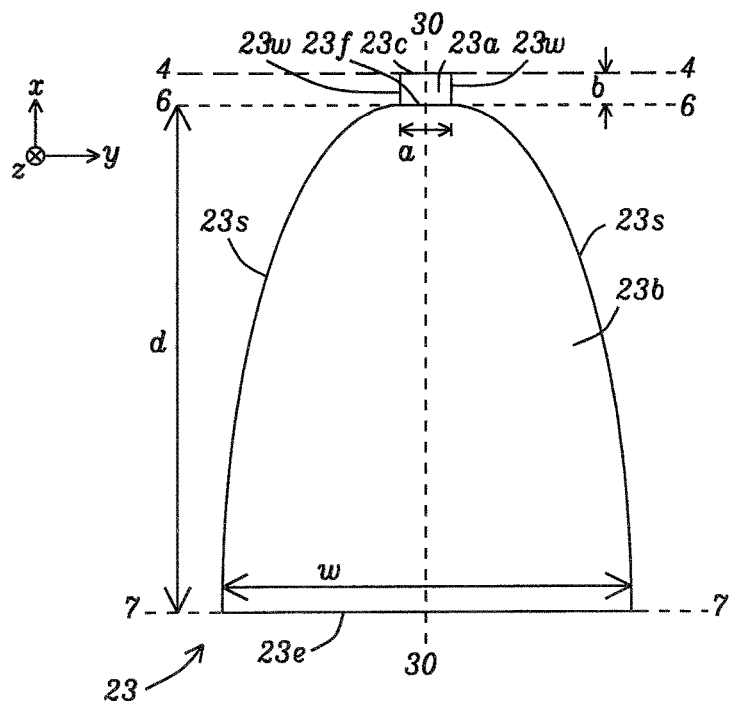

From a top-down view in FIG. 5b with the peg layer removed, the adhesion layer 23 has essentially the same shape as shown for the peg layer in FIG. 2b. In other words, a front side 23f of the back portion 23b of adhesion layer at plane 6-6 is a distance d in the x-axis direction from a back side 23e at plane 7-7. Furthermore, the center plane 30-30 bisects the adhesion layer, and sides 23s are aligned directly above resonator body sides 21s because of the self-aligned process used to fabricate NFT 24 as described in a later section. The back side 23e has a cross-track width w and is aligned above resonator body back side 21e, and below peg layer back side 22e. A front portion 23a of the adhesion layer has a front side 23c at the ABS 4-4, a back side adjoining the back portion at plane 6-6, and two sides 23w aligned orthogonal to the ABS, directly below sides 22w, and separated by cross-track distance a.

As mentioned earlier, a critical requirement for a reliable NFT structure is that the peg shape should not undergo any changes after fabrication so that performance during repeated operation is not degraded. Since the resonator body layer adjoins or is separated from the peg layer by a thin adhesion layer, deformation of the resonator body is likely to induce a change in peg shape as well. Therefore, shape stability is in part related to how the resonator body shape complies with the wetting angle between the NFT resonator layer and the surrounding material which is typically an oxide. Additional embodiments of the NFT structure defined herein take into consideration that forming a resonator body layer having a wetting angle compliant body shape will improve NFT shape stability which in turn enhances NFT reliability.

Figure 6:
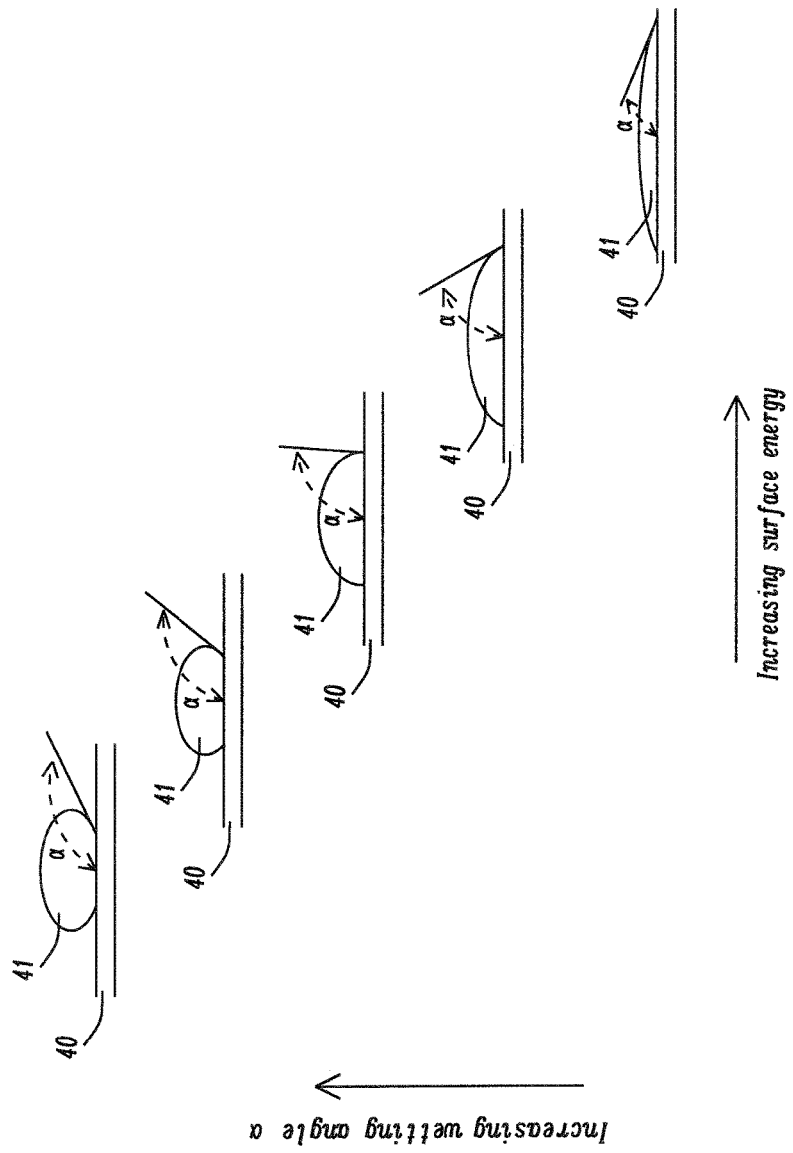
FIG. 6 is a plot showing the relationship between wetting angle of Au on an oxide substrate and the surface energy of said oxide substrate.

Referring to FIG. 6, a series of drawings is pictured with a metal layer 41 such as a resonator body layer formed on a substrate 40 that is an oxide, for example. It should be understood that for good wetting (i.e. good adhesion of the metal layer to the substrate), the surface energy of the oxide substrate should be larger than that of the metal layer. Depending on the metal and oxide compositions, the wetting angle α may vary from substantially greater than 90 degrees in the upper left drawing to substantially less than 90 degrees in the lower right drawing. According to one aspect, as α decreases, there is a greater surface energy associated with the substrate 40 while that of the metal layer 41 remains fixed. From an equivalent standpoint, a lower α value results in a lower surface energy for the metal layer while that of the substrate remains fixed. In either case, oxide substrate surface energy increases relative to that of the metal layer going from left to right in FIG. 6. The wetting angle between Au and $SiO_2$ is approximately 140°, corresponding to the top left drawing in FIG. 6, and is the most stable configuration for Au on silicon oxide.

When this concept is applied to the NFT resonator body layer 21 comprised of Au that adjoins a silicon oxide gap layer 17, for example, deformation of the Au resonator body layer at elevated temperatures is expected to cease once the Au layer reaches a degree of rounding that satisfies the natural occurring wetting angle of 140° between Au and $SiO_2$. Since the main portion of NFT between plane 6-6 and plane 7-7 in FIG. 3 (or FIG. 5a) is formed by a self-aligned process, the desired shape of the resonator body also becomes the shape of the back portion of the peg layer as indicated in FIGS. 2a-2b. We believe it is advantageous to fabricate a NFT top-down shape that already conforms to the 140° wetting angle of the Au/$SiO_2$ interface so that subsequent heating during a write process does not induce further resonator body shape changes thereby improving NFT reliability.

In FIG. 7a that represents one half of the top-down parabolic shape for the resonator body layer previously described with respect to the first embodiment in FIG. 2a, an angle α1 of only 40 degrees is depicted as the subtended angle between plane 6-6 and plane 8-8 on curved side 21s. Each side 21s is essentially a continuous curve between center plane 30-30 and back side 21e.

According to another embodiment depicted in FIG. 7b, each half of the resonator body layer may be modified to include a first side 21s1 extending from the center plane at plane 6-6 to a point 21p, and a second side 21s2 extending from point 21p toward back side 21e. The first side forms an angle θ1 with respect to plane 6-6 while the second side forms an angle θ2 with respect to plane 6-6 where θ2>θ1 and the angle Δ2 formed by sides 21s1, 21s2 is 140 degrees. It follows that a top-down view of sides 22s2 of peg layer 22b, and sides 23s of the adhesion layer (when present) conform to the shape of sides 21s1, 21s2 in the wetting angle compliant design. In some cases, the far end of side 21s2 may be connected by a curved side 21s3 to back side 21e because such a curved shape is more energetically favorable than a sharp corner. It should be understood that the wetting angle may also be modified by including an adhesion layer (not shown) between the resonator body 21 and the surrounding gap layer 17 since the resonator body metal or alloy typically forms a different wetting angle when the composition in the adjoining oxide layer is varied. Note that the peg dimensions a and b shown in FIG. 2b are not adjusted when the parabolic shape for the NFT layers is replaced by a wetting angle compliant shape.

The present disclosure also encompasses a method of the forming a self-aligned hybrid NFT described in one of the aforementioned embodiments. Referring to FIG. 8b, the process begins at a point where a substrate comprised of leading shield 9 and dielectric layer 13 with coplanar top surfaces is provided. A front end of the leading shield is at the ABS 4-4 while a back end thereof adjoins a front side of the dielectric layer. Blocker 25 is formed on a top surface of the leading shield by a conventional method. Thereafter, bottom cladding layer 15 is deposited by an atomic layer deposition (ALD) method on blocker back side 25e to give sloped section 15s, and on dielectric layer 13. Waveguide core 10 is formed on the bottom cladding layer 15 by a fabrication process well known to those skilled in the art. A first chemical mechanical planarization (CMP) process may be performed to give a top waveguide surface that is coplanar with a top surface of sloped section 15s.

Top cladding layer 16, which is typically made of alumina, is then formed on waveguide core 10 and has a front side at the ABS. Next, a first adhesion layer 29 is deposited on the top cladding layer, after which resonator body layer 21 is deposited on the first adhesion layer and has a front side at the ABS 4-4. Note the ABS at this point has not been formed yet and plane 4-4 indicates its eventual position after a back end lapping process.

Figure 8A:
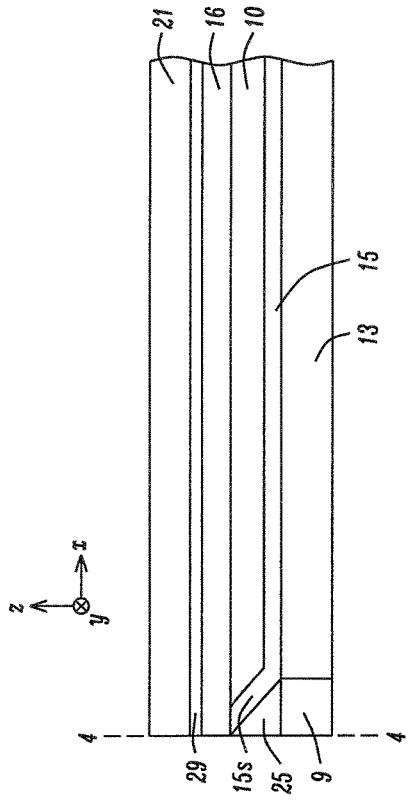
Figure 8B:
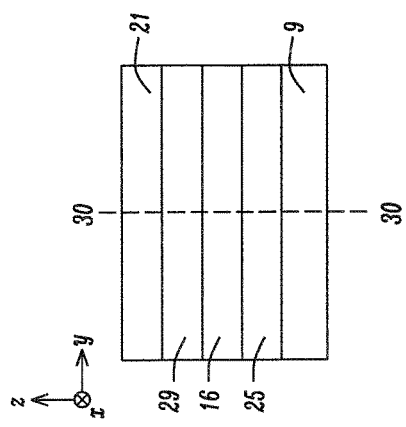

FIG. 8a represents a view along plane 4-4 in FIG. 8b. Center plane 30-30 bisects the partially formed NFT structure where layers 25, 16, 29, and 21 are sequentially stacked on leading shield 9.

Figure 9A:
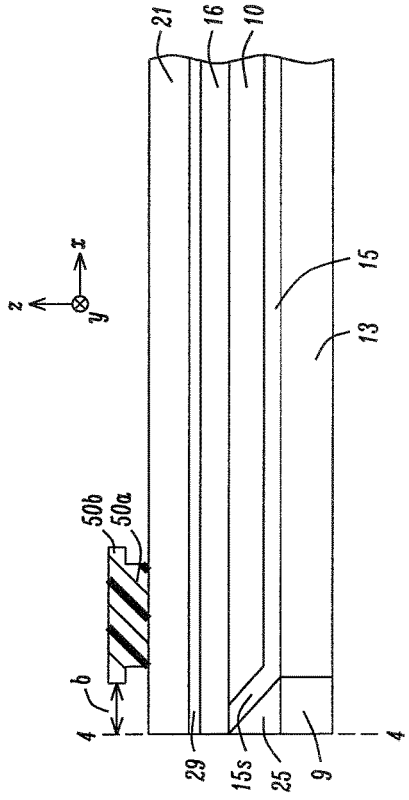
Figure 9B:
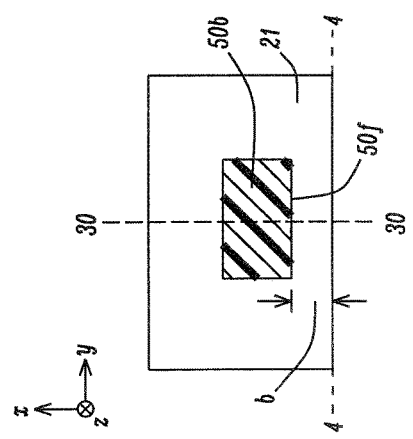

FIG. 9a represents the structure in FIG. 8a from a top-down view after a bilayer photoresist having bottom layer 50a and top layer 50b is coated on resonator body layer 21 and then patterned to give a substantially rectangular shape where front side 50f is recessed a step length b from ABS 4-4. In FIG. 9b, the cross-sectional view of the patterned photoresist layer 50a/50b is shown. Note that the top layer 50b may have a greater cross-sectional area in the x-y plane than layer 50a to facilitate removal during a subsequent step.

Referring to FIG. 10b, ion beam etching (IBE) is performed to remove portions of the resonator body layer 21 and the underlying first adhesion layer 29 that are not protected by the photoresist layers 50a/50b. Then, the photoresist layer is stripped by a conventional method to give a resonator body front face 21f that is recessed a step length b from the ABS 4-4. A substantial portion of top cladding layer top surface 16t is now exposed. FIG. 10a shows a cross-sectional view of the partially formed NFT structure in FIG. 10b along plane 4-4.

According to one embodiment depicted in FIG. 11b, a $SiO_2$ gap layer 17 is deposited on the resonator body layer 21 and on top cladding layer top surface 16t by a plasma enhanced chemical vapor deposition (PECVD) process. However, other gap layers such as alumina or the like may be employed instead of $SiO_2$ for the first gap layer 17. Thereafter, a second CMP process may be performed to form a resonator body top surface 21t that is coplanar with a top surface 17t of the first gap layer. It should be understood that the thickness (t1 in FIG. 5) of the resonator body layer 21 is set at this point in the fabrication sequence. FIG. 11a shows a perspective of the partially formed NFT structure at plane 4-4.

Figure 12B:
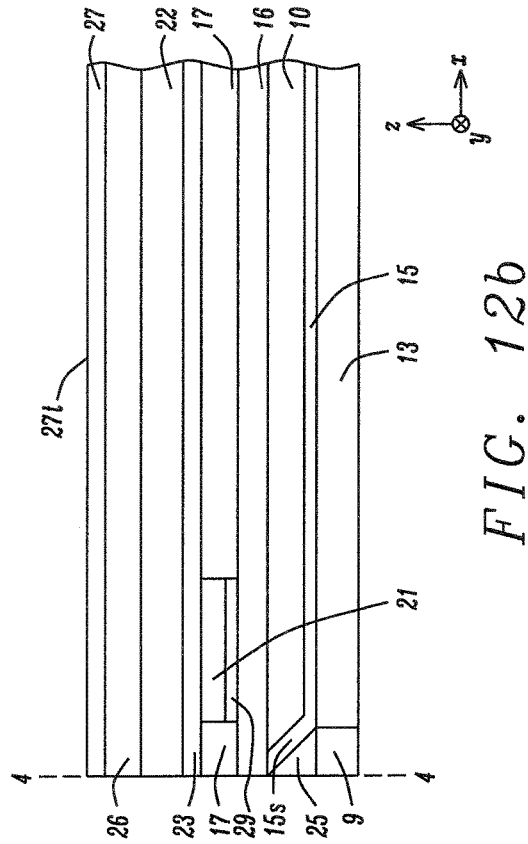
Figure 12A:
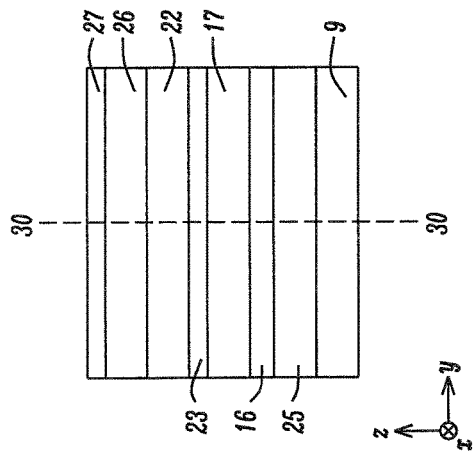

Referring to FIGS. 12a-12b, an optional second adhesion layer 23 made of Ta, for example, the peg layer 22, a carbon hard mask 26, and a Ta hard mask layer 27 are sequentially deposited on the first gap layer 17 and resonator body layer 21. In one embodiment, a sputter deposition system is used to lay down the second adhesion layer, peg layer, and hard mask layers that extend from the ABS toward a back end of the TAMR device. The Ta hard mask layer has a top surface 27t as depicted in FIG. 12b. According to a preferred embodiment, the carbon hard mask layer has a thickness of about 2000 Angstroms and the Ta hard mask layer is about 150 Angstroms thick. The second adhesion layer has a thickness from about 5 to 30 Angstroms.

Figure 13B:
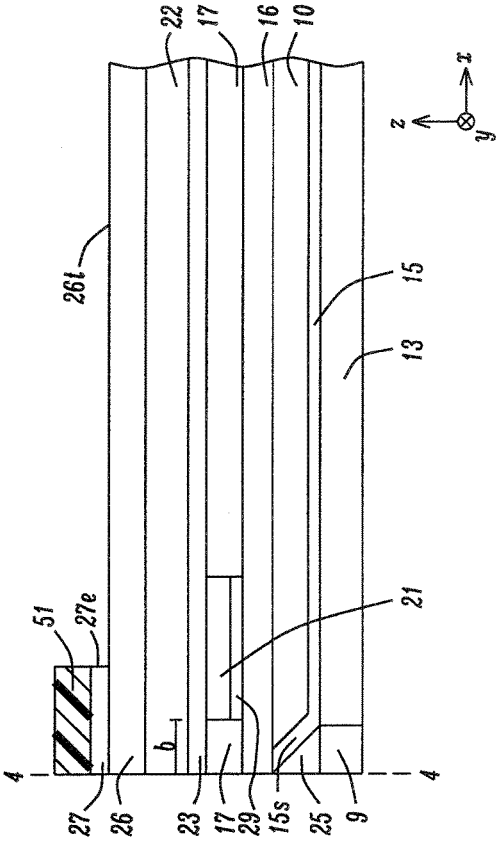
Figure 13A:
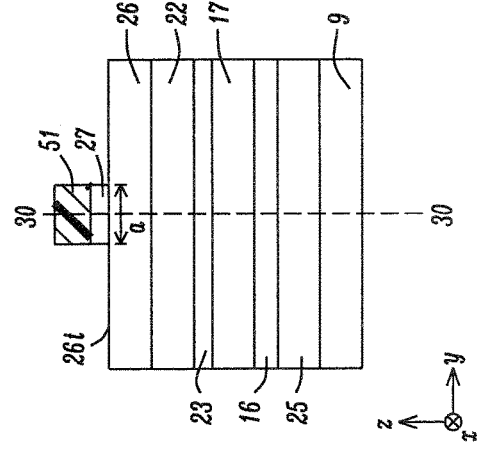

In FIGS. 13a-13b, a photoresist 51 is coated and patterned on the Ta hard mask layer 27 such that the center plane 30-30 bisects the photoresist layer. The cross-sectional width a of the patterned photoresist layer defines the eventual peg layer width at the ABS. Next, a reactive ion etch (RIE) process is employed to remove regions of the Ta hard mask that are not protected by photoresist layer 51, and stops on carbon hard mask layer to expose a portion of top surface 26t thereof. A back side 27e of Ta hard mask 27 is at a distance greater than b from the ABS.

Referring to FIG. 14a, a top-down view of the partially formed NFT structure in FIGS. 13a-13b is shown after the photoresist layer 51 is removed and a second Ta hard mask layer 28 is deposited on Ta hard mask layer 27 by a lift off method which gives a top-down shape that is essentially the same as the that of the back portion 22b of peg layer and resonator body layer 21 to be formed in a subsequent step. The lift off method comprises coating a photoresist layer (not shown) and patterning the photoresist to form an opening therein in the desired shape of the peg layer back portion from a top-down view. Thereafter, the second Ta hard mask is deposited to fill the opening. Next, a conventional lift off step involving a chemical solution is employed to remove the photoresist layer and any second Ta hard mask on a top surface of the photoresist layer. The lift off process also provides a back side 28e having cross-track width w, and sides 28s that converge at a front side 28f which is a step length b from the ABS 4-4. Preferably, the second Ta layer is bisected by center plane 30-30. In the exemplary embodiment, back side 28e is a greater distance from the ABS than back side 27e.

FIG. 14b indicates that a front side of the second Ta hard mask 28 is recessed a step length b from the ABS. A back portion of the second Ta hard mask may adjoin a back side of the first Ta hard mask 27.

Referring to FIG. 15a, a RIE process is performed to remove unprotected regions of the carbon hard mask layer 26. In other words, the shape of the first and second Ta hard masks 27, 28 are transferred to the carbon hard mask, and the etch process stops on the peg layer 22. Then, an IBE etch is employed to transfer the carbon hard mask pattern through unprotected regions of the peg layer, second adhesion layer 23, and resonator body layer 21 thereby defining the sides 21s, 22s, ends 21e, 22e shown in FIG. 2a-2b, and sides 23s and end 23e depicted in FIG. 5b. Meanwhile, the IBE process removes the Ta hard masks. Since the shape of the resonator body layer, second adhesion layer, and back portion 23b of peg layer are determined simultaneously by the aforementioned IBE step, this method is called a self-aligned process.

In FIGS. 16a-16b, the remaining portion of carbon hard mask 26 is selectively removed by a RIE process that does not substantially etch into any of the other layers in the NFT structure.

In FIGS. 17a-17b, a third gap layer 20 is deposited by a PECVD method and another CMP process is performed to form a top third gap layer surface 20t that is coplanar with a top surface 22t of the peg layer. In some embodiments, the third gap layer is comprised of $SiO_2$. In other embodiments, a different dielectric material such as alumina is used for the third gap layer. In another embodiment, a third adhesion layer made of one of the materials in the second adhesion layer 23, for example, is deposited on the sidewalls of layers 17, 22, 23 before the third gap layer is deposited. The third adhesion layer may be advantageous in promoting better adhesion between the NFT layers and the first gap layer 17, and in enabling a different wetting angle compliant (top-down) shape for NFT layers 21-23.

The present disclosure has an advantage over the prior art in that it provides a hybrid NFT design with a peg layer that is more resilient to thermal and mechanical stress, and a blocker structure between an end of the waveguide and the ABS to prevent unwanted heating of the magnetic medium in a vicinity proximate to the heating spot location during a write process. Furthermore, the resonator body layer, and back portions of the adhesion layer (when present) and peg layer are formed by a self-aligned process to afford a better overlay of the peg layer above the resonator body layer for improved performance. The substantially large back portion of peg layer and overlying heat sink enable heat flow away from the peg to minimize the thermal stress therein. The overall sequence is compatible with existing magnetic head fabrication techniques.

While this disclosure has been particularly shown and described with reference to, the preferred embodiment thereof, it will be understood by those skilled in the art that various changes in form and details may be made without departing from the spirit and scope of this disclosure.

We claim:

1. A near field transducer (NFT) formed between a main pole layer and a waveguide in a thermally assisted magnetic recording (TAMR) head wherein waveguide light excites a NFT resonant mode that propagates to an air bearing surface (ABS) and is coupled to a magnetic medium to facilitate a write process, the NFT comprises:
    (a) a resonator body layer made of a first metal or alloy with a plasmonic character and having a first thickness (t1) in a down-track direction wherein the NFT resonant mode is excited, the resonator body layer has a front side having a first cross-track width at a first plane that is recessed a first distance from the ABS, a back side with a second cross-track width greater than the first cross-track width at a second plane formed parallel to the ABS and first plane, and two sides connecting the front and back sides wherein the two sides are separated by an increasing cross-track distance with increasing distance from the first plane to the back side; and
    (b) a peg layer having a second thickness (t2) in a down-track direction wherefrom the NFT resonant mode is coupled to the magnetic medium, the peg layer is a single layer and consists of a single material that is Rh, Ru, Pd, Pt, TiN, or ZrN and is different from the first metal or alloy and comprises:
        (1) a peg portion or peg with a front side at the ABS, a back side at the first plane, and two sides aligned orthogonal to the ABS and separated by the first cross-track width; and
        (2) a back portion of the peg layer having a front side with the first cross-track width and adjoining the peg at the first plane; a back side having the second cross-track width at the second plane, and two sides connecting the front and back sides, the two sides of the back peg layer portion are aligned above the two resonator body layer sides in a self-aligned NFT structure having a thickness (t1+t2) between a top surface of the peg layer and a bottom surface of the resonator body layer wherein the top surface of the peg layer faces a leading side of the main pole layer, and the bottom surface of the resonator body layer faces the waveguide, and wherein the peg layer top surface is a planar surface formed on the back portion and on the peg portion.

2. The near field transducer of claim 1 wherein the first cross-track distance is from about 20 to 60 nm.

3. The near field transducer of claim 1 wherein the first distance is from about 10 to 50 nm.

4. The near field transducer of claim 1 wherein the first thickness is a down-track thickness of about 30-50 nm, and the second thickness is a down-track thickness of about 35-55 nm.

5. The near field transducer of claim 1 wherein the resonator body layer is a metal that is Au, Ag, Cu, or an alloy thereof.

6. The near field transducer of claim 1 wherein the resonator body layer has a wetting angle compliant shape defined by a wetting angle formed by a metal in the resonator body layer and a metal oxide in an oxide layer that adjoins the sides of the resonator body layer proximate to the first plane.

7. A thermally assisted magnetic recording (TAMR) head wherein waveguide light excites a resonant mode in a near field transducer (NFT) that propagates to an air bearing surface (ABS) and is coupled to a magnetic medium to facilitate a write process, comprising:
    (a) a main pole layer having a front side at the ABS and a bottom surface that is a leading side during the write process;
    (b) a waveguide having a top surface facing the main pole layer and wherein light from a laser diode is propagated toward the ABS, and with a front side that faces the ABS;
    (c) the near field transducer that is formed between the main pole layer and the waveguide at the ABS, the near field transducer comprises:
        (1) a resonator body layer made of a first metal or alloy with a plasmonic character and having a first thickness (t1) wherein the resonant mode is excited, the resonator body layer has a bottom surface facing the waveguide, a front side having a first cross-track width at a first plane that is recessed a first distance from the ABS, a back side with a second cross-track width greater than the first cross-track width at a second plane formed parallel to the ABS and first plane, and two sides connecting the front and back sides wherein the two sides are separated by an increasing cross-track distance with increasing distance from the first plane; and
        (2) a peg layer consisting of a material with a different composition from the first metal or alloy and having a second thickness (t2) and with a top surface facing the main pole layer, the resonant mode is coupled to the magnetic medium via a peg portion in the peg layer, the peg layer comprises:

the peg portion or peg with a front side at the ABS, a back side at the first plane, and two sides aligned orthogonal to the ABS and separated by the first cross-track width; and a back portion of the peg layer having a front side with the first cross-track width and adjoining the peg at the first plane; a back side having the second cross-track width at the second plane, and two sides connecting the front and back sides, the two sides of the back peg layer portion are aligned above the two resonator body sides in a self-aligned NFT structure having a thickness (t1+t2) between a top surface of the peg layer and a bottom surface of the resonator body layer wherein the top surface of the peg layer faces a leading side of the main pole layer, and the bottom surface of the resonator body layer faces the waveguide;

(d) a blocker comprising a metal formed between a front side of the waveguide and the ABS, the blocker prevents waveguide light not coupled to the NFT from reaching the ABS, wherein the blocker has a back side with a maximum distance from the ABS that is less than a distance of the front side of the waveguide from the ABS; and (e) and a dielectric layer between the blocker back side and the waveguide front side.

8. The TAMR head of claim 7 wherein the self-aligned NFT structure further comprises a first adhesion layer having a bottom surface contacting a top surface of the resonator body layer, and a top surface adjoining a bottom surface of the peg layer, the first adhesion layer has a shape from a top-down (down-track) view essentially the same as that of the overlying peg layer such that a front end of a first section at the ABS has the first cross-track width, and a back end of a second section at the second plane has the second cross-track width.

9. The TAMR head of claim 7 wherein the first cross-track width is from about 20 to 60 nm, and the first distance is from about 10 to 50 nm.

10. The TAMR head of claim 7 wherein the first thickness is a down-track thickness of about 30-50 nm, and the second thickness is a down-track thickness of about 35-55 nm.

11. The TAMR head of claim 7 wherein the resonator body layer is comprised of a metal that is Au, Ag, Cu, or an alloy thereof.

12. The TAMR head of claim 7 wherein the peg layer is comprised of Rh, Ru, Pd, Pt, TiN, or ZrN.

13. The TAMR head of claim 8 wherein the first adhesion layer is comprised of Ta, Zr, Y, or Ir.

14. The TAMR head of claim 7 wherein the blocker is made of Rh, TiN, Ru, NiFe, or FeCo.

15. The TAMR head of claim 7 wherein the resonator body layer has a wetting angle compliant shape defined by a wetting angle formed by a metal in the resonator body layer and a metal oxide in an oxide layer that adjoins the sides of the resonator body layer proximate to the first plane.

16. A method of fabricating a near field transducer in a TAMR head, comprising:

(a) forming a waveguide on a bottom cladding layer, and facing a blocker having a front side at an air bearing surface (ABS) and a back side adjoining a first gap layer that separates the blocker and waveguide;

(b) sequentially depositing a first adhesion layer and a resonator body layer portion of the near field transducer (NFT) on the first gap layer and waveguide;

(c) patterning the resonator body layer to form a front side thereof that is recessed a first distance from the ABS;

(d) sequentially forming a second adhesion layer, a peg layer portion of the NFT, and then a hard mask comprised of a lower carbon layer and an upper first Ta layer on the resonator body layer and a surrounding oxide layer;

(e) patterning the first Ta hard mask to form a rectangular shape having a first cross-track width that will define a first cross-track width in a peg portion of the NFT peg layer in a later step;

(f) patterning a second Ta hard mask on the first Ta hard mask, the second Ta hard mask pattern defines a top-down shape that is subsequently etch transferred into the peg layer portion, second adhesion layer, and resonator body layer, the top-down shape has a back side formed parallel to the ABS, and two sides separated by a greater cross-track distance with increasing distance from the ABS;

(g) performing a first reactive ion etch to remove unprotected portions of the carbon hard mask, and then an ion beam etch to remove unprotected portions of the second adhesion layer and resonator body layer, and thereby defining the sides of the peg layer, second adhesion layer, and resonator body layer in a self-aligned process, and removing the remaining portions of the first and second Ta hard masks; and (h) performing a second reactive ion etch to remove the remaining portion of carbon hard mask.

17. The method of claim 16 wherein the first cross-track width is from about 20 to 60 nm.

18. The method of claim 16 wherein the recessed distance of the resonator body layer from the ABS is from about 10 to 50 nm.

19. The method of claim 16 wherein the resonator body layer has a down-track thickness of about 30-50 nm, and the peg layer has a down-track thickness of about 35-55 nm.

20. The method of claim 16 wherein the resonator body layer is comprised of a metal that is Au, Ag, Cu, or an alloy thereof.

21. The method of claim 16 wherein the peg layer is comprised of Rh, Ru, Pd, Pt, TiN, or ZrN.

22. The method of claim 16 wherein the second adhesion layer is comprised of Ta, Zr, Y, or Ir.

23. The method of claim 16 wherein the blocker is made of Rh, TiN, Ru, NiFe, FeCo, or comprises a stack of dielectric layers to prevent waveguide light that is not coupled to the NFT from reaching the ABS.

24. The method of claim 16 further comprised of depositing an oxide layer that adjoins the sides of the peg layer, second adhesion layer, and resonator body layer, and forming a top surface on the oxide layer that is coplanar with a top surface of the peg layer.

25. The method of claim 24 wherein the resonator body layer has a wetting angle compliant shape defined by a wetting angle formed by a metal in the resonator body layer and a metal oxide in the oxide layer that adjoins the sides of the resonator body layer proximate to a front side of the resonator body layer.

26. A near field transducer (NFT) formed between a main pole layer and a waveguide in a thermally assisted magnetic recording (TAMR) head wherein waveguide light excites a NFT resonant mode that propagates to an air bearing surface (ABS) and is coupled to a magnetic medium to facilitate a write process, the NFT comprises:

(a) a resonator body layer made of a first metal or alloy with a plasmonic character and having a first thickness (t1) in a down-track direction wherein the NFT resonant mode is excited, the resonator body layer has a front side having a first cross-track width at a first plane that is recessed a first distance from the ABS, a back side with a second cross-track width greater than the first cross-track width at a second plane formed parallel to the ABS and first plane, and two sides connecting the front and back sides wherein the two sides are separated by an increasing cross-track distance with increasing distance from the first plane to the back side;

(b) a peg layer having a second thickness (t2) in a down-track direction wherefrom the NFT resonant mode is coupled to the magnetic medium, the peg layer is a single layer and consists of a single material that is different from the first metal or alloy and comprises:

(1) a peg portion or peg with a front side at the ABS, a back side at the first plane, and two sides aligned orthogonal to the ABS and separated by the first cross-track width; and (2) a back portion of the peg layer having a front side with the first cross-track width and adjoining the peg at the first plane; a back side having the second cross-track width at the second plane, and two sides connecting the front and back sides, the two sides of the back peg layer portion are aligned above the two resonator body layer sides in a self-aligned NFT structure) between a top surface of the peg layer and a bottom surface of the resonator body layer wherein the top surface of the peg layer faces a leading side of the main pole layer, and the bottom surface of the resonator body layer faces the waveguide, and wherein the peg layer top surface is a planar surface formed on the back portion and on the peg portion; and (c) a first adhesion layer having a bottom surface contacting a top surface of the resonator body layer, and a top surface adjoining a bottom surface of the peg layer, the first adhesion layer has a shape from a top-down (down-track) view essentially the same as that of the overlying peg layer such that a front end at the ABS has the first cross-track width, and a back end at the second plane has the second cross-track width.

27. The near field transducer of claim 26 wherein the peg layer comprises Rh, Ru, Pd, Pt, TiN, or ZrN.

28. The near field transducer of claim 26 wherein the resonator body layer is a metal that is Au, Ag, Cu, or an alloy thereof.

29. The near field transducer of claim 26 wherein the first adhesion layer is comprised of Ta, Zr, Y, or Ir.

* * * * *